United States Patent
Kamir et al.

(10) Patent No.: US 11,218,476 B2
(45) Date of Patent: Jan. 4, 2022

(54) VEHICLE AUTHENTICATION AND PROTECTION SYSTEM

(71) Applicant: ENIGMATOS LTD., Yavne (IL)

(72) Inventors: Eyal Kamir, Ganei Tikva (IL); Alexander Fok, Rehovot (IL); Orit Fredkof, Rishon (IL); Avi Bitton, Yavne (IL); Yehonatan shlomo Malka, Alei-Zahav (IL); Charly Bitton, Zichron Yaakov (IL); Liran Zwickel, Or Yehuda (IL); Uriel Friedman, Alei-Zahav (IL); Meni Dali, Pitach Tiqva (IL)

(73) Assignee: ENIGMATOS LTD., Yavne (IL)

(*) Notice: Subject to any disclaimer, the term of this patent is extended or adjusted under 35 U.S.C. 154(b) by 0 days.

(21) Appl. No.: 16/767,986

(22) PCT Filed: Jan. 11, 2019

(86) PCT No.: PCT/IL2019/050048
§ 371 (c)(1),
(2) Date: May 28, 2020

(87) PCT Pub. No.: WO2019/138408
PCT Pub. Date: Jul. 18, 2019

(65) Prior Publication Data
US 2020/0389453 A1    Dec. 10, 2020

Related U.S. Application Data

(60) Provisional application No. 62/658,637, filed on Apr. 17, 2018, provisional application No. 62/616,019, filed on Jan. 11, 2018.

(51) Int. Cl.
*G06F 7/04*      (2006.01)
*H04L 29/06*     (2006.01)
*G07C 5/00*      (2006.01)

(52) U.S. Cl.
CPC .......... *H04L 63/0876* (2013.01); *G07C 5/008* (2013.01); *H04L 63/0892* (2013.01); *H04L 63/102* (2013.01); *H04L 63/126* (2013.01)

(58) Field of Classification Search
CPC .. G06F 21/6245; G06F 21/6254; G06F 21/44; H04L 2209/84; H04L 63/0876;
(Continued)

(56) References Cited

U.S. PATENT DOCUMENTS

| | | |
|---|---|---|
| 9,104,538 B2 | 8/2015 | Garrett et al. |
| 9,578,047 B2 | 2/2017 | Laifenfeld et al. |

(Continued)

OTHER PUBLICATIONS

Zhang et al., Defensing the Malicious Attacks of Vehicular Network in Runtime Verification Perspective, IEEE, Aug. 22, 2016, pp. 126-133. (Year: 2016).*

(Continued)

*Primary Examiner* — Luu T Pham
*Assistant Examiner* — Jenise E Jackson
(74) *Attorney, Agent, or Firm* — Polsinelli PC

(57) ABSTRACT

The present disclosure relates to a system for authenticating a computerized sub-system of a vehicle, comprising: (A) at the vehicle: (a) a tele-processor configured to periodically record during a period T1 a flow of messages over a bus of the vehicle's sub-system, and to transmit periodically every period T2 the recorded flow of messages to a remote server via a transceiver; (B) at a remote authentication server: (b) a transceiver configured to receive each of said recorded flow of messages; (c) a profile generator configured to generate from each of said flow of messages a temporary profile; and (d) a comparator configured to compare each of said temporary profiles with a final profile which was previously created based on one or more of flows of messages within the vehicle's bus.

19 Claims, 8 Drawing Sheets

(58) Field of Classification Search
CPC .. H04L 63/0892; H04L 63/102; H04L 63/126
USPC .............................................................. 726/7
See application file for complete search history.

(56) References Cited

U.S. PATENT DOCUMENTS

| | | | |
|---|---|---|---|
| 2014/0309853 A1 | 10/2014 | Ricci | |
| 2015/0195297 A1* | 7/2015 | Ben Noon | B60R 25/00 726/22 |
| 2015/0319511 A1* | 11/2015 | Droste | H04Q 9/00 340/870.07 |
| 2015/0331422 A1* | 11/2015 | Hartung | H04L 12/40013 701/23 |
| 2016/0381066 A1* | 12/2016 | Galula | G07C 5/0841 726/23 |
| 2017/0139411 A1* | 5/2017 | Hartung | G05D 1/0077 |
| 2017/0341604 A1 | 11/2017 | Noon Ben et al. | |
| 2017/0359679 A1* | 12/2017 | Ledvina | G01S 5/0252 |

OTHER PUBLICATIONS

Yan et al, Security Challenges in Vehicular Cloud Computing, IEEE, Mar. 2013, pp. 284-294. (Year: 2013).*
Wang et al, VeCure: A Practical Security Framework to Protect the CAN Bus of Vehicles, IEEE, Oct. 8, 2014, pp. 1-6. (Year: 2014).*
International Search Report and Written Opinion; PCT Application No. PCT/IL2019/050048; dated Apr. 17, 2019.
International Preliminary Report on Patentability; PCT/IL2019/050048; dated May 10, 2020.

* cited by examiner

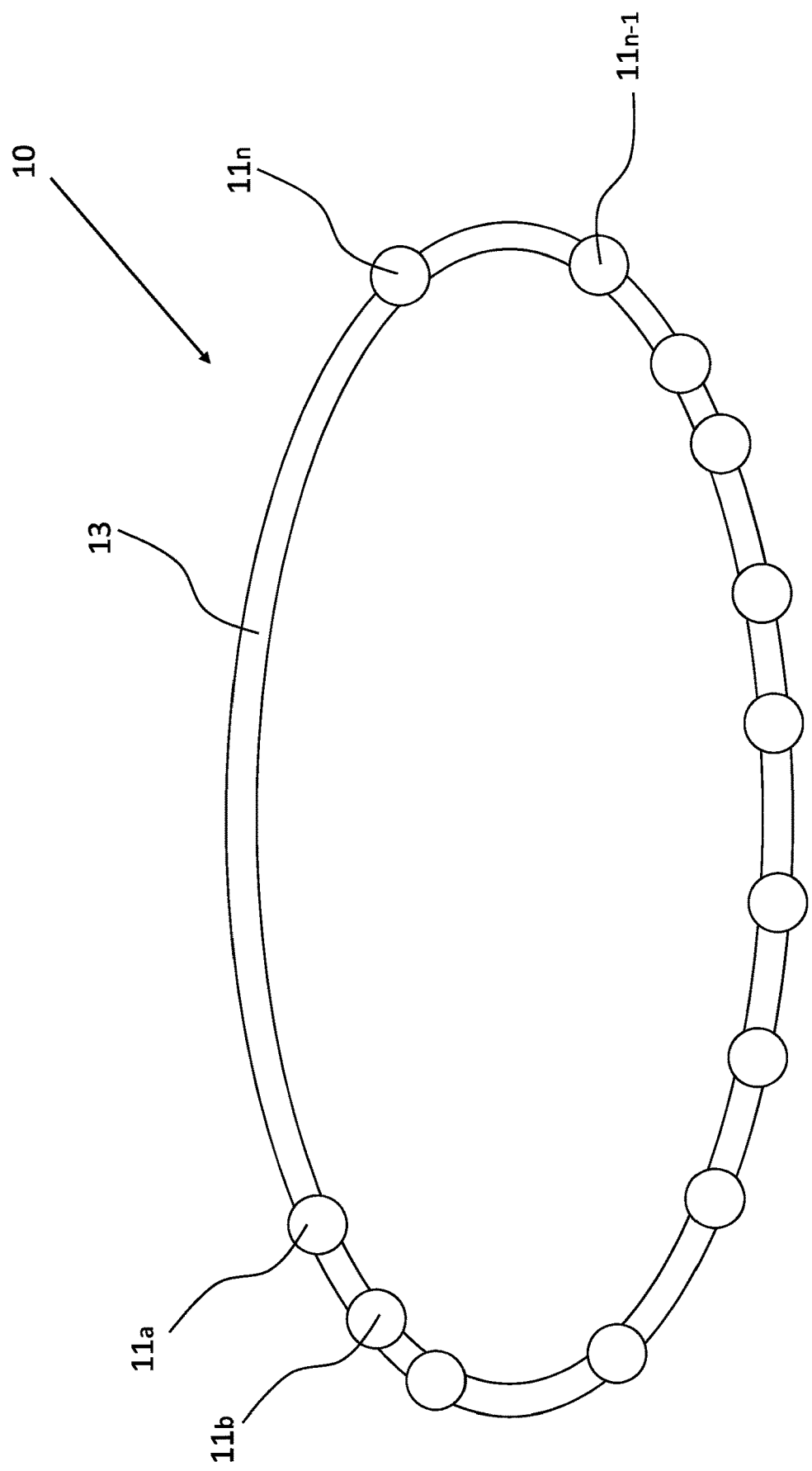
Fig. 1 – Prior Art

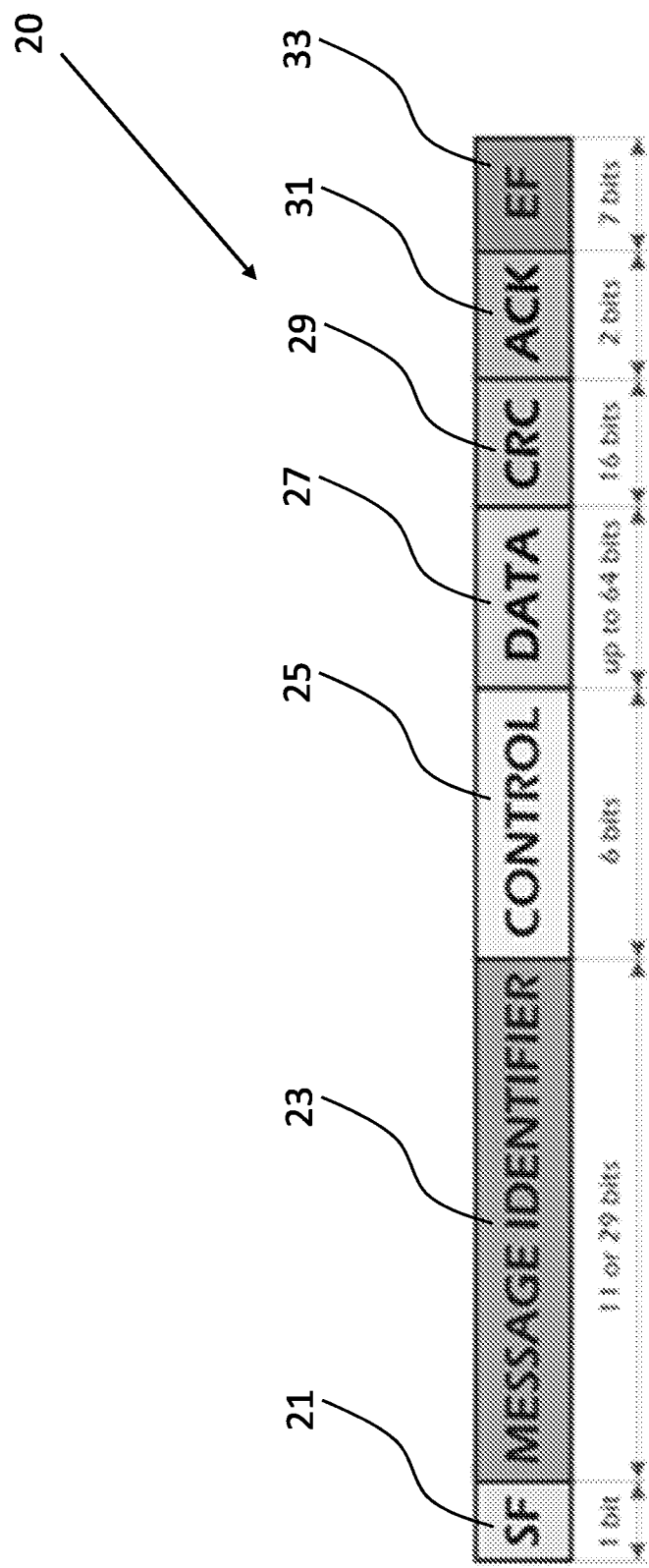
Fig. 1a – Prior Art

VEHICLE AUTHENTICATION AND PROTECTION SYSTEM

CROSS-REFERENCE TO RELATED APPLICATIONS

This application is a national stage entry of international application number PCT/IL2019/050048 filed Jan. 11, 2019 which claims the benefit of U.S. Provisional Application No. 62/658,637, filed Apr. 17, 2018 and the benefit of U.S. Provisional Application No. 62/616,019, filed Jan. 11, 2018, each of said applications are expressly incorporated herein by reference in their entirety.

FIELD OF THE INVENTION

The present disclosure relates to a system and method for detecting malicious activities in a vehicle computerized sub-system, and for determining the authenticity of the vehicle.

BACKGROUND OF THE INVENTION

With $1.5 Trillion USD of annual turnover, the automotive industry is one of the most significant verticals. These days it witnesses a storm of change through a set of disruptive technologies driving the concept of connected and autonomous vehicles. This process requires a robust, foolproof and affordable cyber security solution, to allow adoption by the mass market. Moreover, many of today's 1.2 billion of cars on the roads already have connected components and are susceptible to cyber hacking. The vehicle is a complex network of computers on the move—today's vehicles have dozens (in many cases more than 50) of Electronic Control Units (ECU's) and more than 100M code lines. The connectivity between the car and external entities adds multiple attack surfaces, leaving the car and its passengers vulnerable. For example, today's cars are already designed to communicate with one another, with road signs, with traffic lights, with the manufacturer's server, and more. To allow all these communications, the necessity for a reliable vehicle authentication becomes extremely important. In addition, there are various cases where the vehicle has to be authenticated in order to allow access to sensitive services or assets within the car, for example, during diagnostic a maintenance. For example, when a vehicle connects to an OEM diagnostic device, the vehicle must be authenticated to allow access of the vehicle to trusted maintenance assets of the OEM (e.g., for software and firmware updates).

With the introduction of the Connected-Cars based services, the vehicle authentication becomes even more important. A need for a protected authentication raises, challenging existing and potential solutions. One of the main challenges of the vehicle authentication is the fact that the vehicle is a complex network of dozens of vehicle Electronic Computing Units (ECUs) connected between them on in-vehicle networks. From this perspective, the vehicle can be seen as an enterprise network that has diverse networks based on various communication protocols, mainly on CAN-bus which is the most accepted protocol. The terms "bus", "buses", and "network" are used herein interchangeably. Furthermore, enterprise networks cyber defense level is much higher due to the following reasons:

The enterprise network physical perimeter is protected.
The enterprise network communication contains a variety of cyber security defence technologies, e.g., firewalls, IDPSs, encrypted communication, etc.
Professional IT teams have permanent access to the enterprise networks, thus allowing their continuous maintenance procedures, including handling of certificates and key management procedures, while they are also capable of performing malicious actions within the vehicle.

There are several approaches to the above complications that are currently in use, as follows:

No authentication at all—Cars are not connected, vehicle control functions are local and implemented on a single, dedicated ECU. According to this scheme, most of the existing vehicles do not have any authentication mechanism. OEMs hide proprietary technical information, like communication protocols and in-vehicle networks topology. The lack of information requires significant efforts and use of reverse engineering techniques. These techniques are successfully used by after-market vehicles improvement workshops and various generic manufacturers producing fake vehicles parts, including ECUs.

Physical fingerprint of a gateway (GW), representing the vehicle—With the massive introduction of generic diagnostic devices, some OEMs began to 'lock' advanced maintenance ECU functions, such as FW updates. The original diagnostic device (VCI—vehicle communication interface) provides a 'secret' handshake with the vehicle's gateway that unlocks the for these advanced functions. An example of such mechanism is the K-line pin of OBD-II port that is used in addition to the traditional CAN-H and CAN-L wires. This technique is widely used by some truck OEMs. It is clear that this mechanism provides a limited VCI authentication and, once reverse engineered, it can be easily bypassed by third parties.

Use of vehicle identification number—In addition to the above physical fingerprint mechanism, a local handshake between a VCI and a vehicle gateway can be used, utilizing Vehicle Identification Number (VIN). A VIN based handshake does not provide sufficient level of authenticity since it can be exposed by other sources—(sometimes just written on a publicly visible plate behind the vehicle front window) thus can be easily faked.

VCI and target ECU handshake—Some advanced OEMs began to introduce ECU secure mode that requires a quite complex authentication handshake with VCI. Very advanced OEMs connected their VCI to OEM cloud for cloud-based authentication handshake, hiding cryptographic keys both at an ECU within the vehicle and on the OEM cloud. This technique provides authentication solution for an ECU, but is limited for the vehicle authentication and can be hardly used for emerging V2X (Vehicle to another entity) use cases.

Use of a cryptographic certificate stored on one of the vehicle's ECUs—This emerging solution is based on the traditional PKI (Private Key Infrastructure) certificate infrastructure widely used in various IT fields, e.g., WEB sites authentication. There are some drawbacks in this solution:

Private driver information leakage: Use of a static certificate allows malicious actors with a man on the side or a man on the middle capabilities on the communication channel, vehicles location identification and tracking.

Certificate management procedure: The management of this procedure is relatively complicated, since the vehicle might have limited car connectivity, and is generally in possession of a private customer.

The vehicle physical access is not protected: Thus a malicious person can obtain a full access to the HW\ECU that stores the sensitive authentication data. This access gives a significant advantage to an attacker who may perform reverse engineering and vulnerability research. In a worst case, the attacker may even be capable to plug off the vehicle ECU and replace it by a system of his choice, pretending the original vehicle identity. It should be noted that a change of a vehicle identity does not necessarily requires a replacement of hardware, and therefore may be made without a physical access to the vehicle.

The diversity of proprietary solutions and the lack of standardization create severe challenges for international and national law enforcement agencies.

The above issues create a severe security problem for any connected car service, challenging vehicles authentication and trust relations, and vehicle cyber state.

It is still another object of the present disclosure to detect an unauthorized change of the vehicle's identity or to allow identification of a vehicle, based on its computerized sub-system.

It is therefore an object of the present disclosure to provide a system and method for continuously protecting a vehicle computerized sub-system from malicious actions, while also providing trusted authentication mechanism for connected car services.

It is still another object of the present disclosure to determine unauthorized manipulations and irregularities within the vehicle's computerized sub-system.

Other objects and advantages of the present disclosure will become apparent as the description proceeds.

SUMMARY OF THE INVENTION

The present disclosure relates to a system for authenticating a computerized sub-system of a vehicle, comprising: (A) at the vehicle: (a) a tele-processor configured to periodically record during a period T1 a flow of messages over a bus of the vehicle's sub-system, and to transmit periodically every period T2 the recorded flow of messages to a remote server via a transceiver; (B) at a remote authentication server: (b) a transceiver configured to receive each of said recorded flow of messages; (c) a profile generator configured to generate from each of said flow of messages a temporary profile; and (d) a comparator configured to compare each of said temporary profiles with a final profile that was previously created based on one or more of flows of messages within the vehicle's bus, and to issue an authentication alert in a case of mismatch within predefined envelopes.

In an embodiment of the present disclosure, each of said temporary and final profiles comprises machine-related parameters or parameters related to the computerized sub-system that are sufficient to identify the vehicle, and wherein said authentication is a verification of the vehicle's identity.

In an embodiment of the present disclosure, said tele-processor comprising a sensor configured to sense the messages flowing on the bus, a controller, and a storage for storing accumulated messages.

In an embodiment of the present disclosure, said profile generator is further configured to generate said final profile based on one or more flows of messages, whose accumulated duration in total is significantly longer than the period In an embodiment of the present disclosure, said profile generator generates said final profile and said temporary profile based on a substantially same set of rules.

In an embodiment of the present disclosure, said comparator is configured to verify whether a match exists between said final profile and said temporary profile within predefined envelopes, and when a mismatch is found, an alert is issued.

In an embodiment of the present disclosure, a mismatch outside of said envelopes hints to one or more of: (a) a malicious activity within said vehicle's sub-system; (b) a malicious activity to fake the identity of the vehicle; (c) installation of a non-original or non-standard element within said vehicle's computerized sub-system; or (d) installation of a non-standard element within a communication network of the vehicle.

In an embodiment of the present disclosure, said remote authentication server further comprising a storage for storing the received flows of messages, the temporary profile, and at least one final profile. In an embodiment of the invention, said envelopes are defined by said profile generator, manually, or by a combination thereof.

In an embodiment of the present disclosure, said temporary profile and said final profile comprise a plurality of parameters of the computerized sub-system or the vehicle whose values are machine-vehicle dependent, rather than parameters whose values are driver's or environmental dependent.

In an embodiment of the present disclosure, the final profile is stored within the remote authentication server, within the vehicle, or both within the remote server and within the vehicle.

In an embodiment of the present disclosure, the final profile is updated following a maintenance of the vehicle at a trusted repair shop.

In an embodiment of the present disclosure, the bus is a CAN-bus.

In an embodiment of the present disclosure, the communication on the bus is based on Flexray, Ethernet, or another communication protocol suitable for use in a vehicle's bus.

The present disclosure also relates to a method for authenticating a computerized sub-system of a vehicle, comprising: (a) installing within said computerized sub-system of the vehicle a tele-processor; (b) periodically recording by said tele-processor during a period T1 a flow of messages over a bus of the vehicle's sub-system, and transmitting periodically every period T2 the recorded flow of messages to a remote authentication server; at the remote authentication server: (c) receiving each of said recorded flow of messages; (d) generating from each of said flow of messages a temporary profile; and (e) comparing each of said temporary profiles with a final profile that was previously created based on one or more of periodic flows of messages within the vehicle's bus, and issuing an authentication alert in a case of a mismatch within predefined envelopes.

In an embodiment of the present disclosure, the authentication is a verification of the vehicle's identity.

In an embodiment of the present disclosure, the final profile is generated based on one or more periodic flows of messages, whose duration in total is much longer than the period T1

In an embodiment of the present disclosure, the final profile and said temporary profile are created based on a substantially same set of rules.

In an embodiment of the present disclosure, the comparison verifies whether a match exists between said final profile and said temporary profile to within predefined envelopes.

In an embodiment of the present disclosure, the comparison mismatch hints to one or more of: (a) a malicious activity within said vehicle's sub-system; (b) a faked identity of the vehicle; or (c) installation of a non-original element within the vehicle's sub-system.

In an embodiment of the present disclosure, the temporary profile and said final profile comprise a plurality of parameters of the computerized sub-system whose values are machine-vehicle dependent, rather than parameters whose values are driver's or environmental dependent.

In an embodiment of the present disclosure, final profile is updated following a maintenance of the vehicle at a repair shop.

BRIEF DESCRIPTION OF THE DRAWINGS

In the drawings:

FIG. 1 generally illustrates in schematic form a typical prior art computerized sub-system of a vehicle;

DETAILED DESCRIPTION OF PREFERRED EMBODIMENTS

Figure 2:
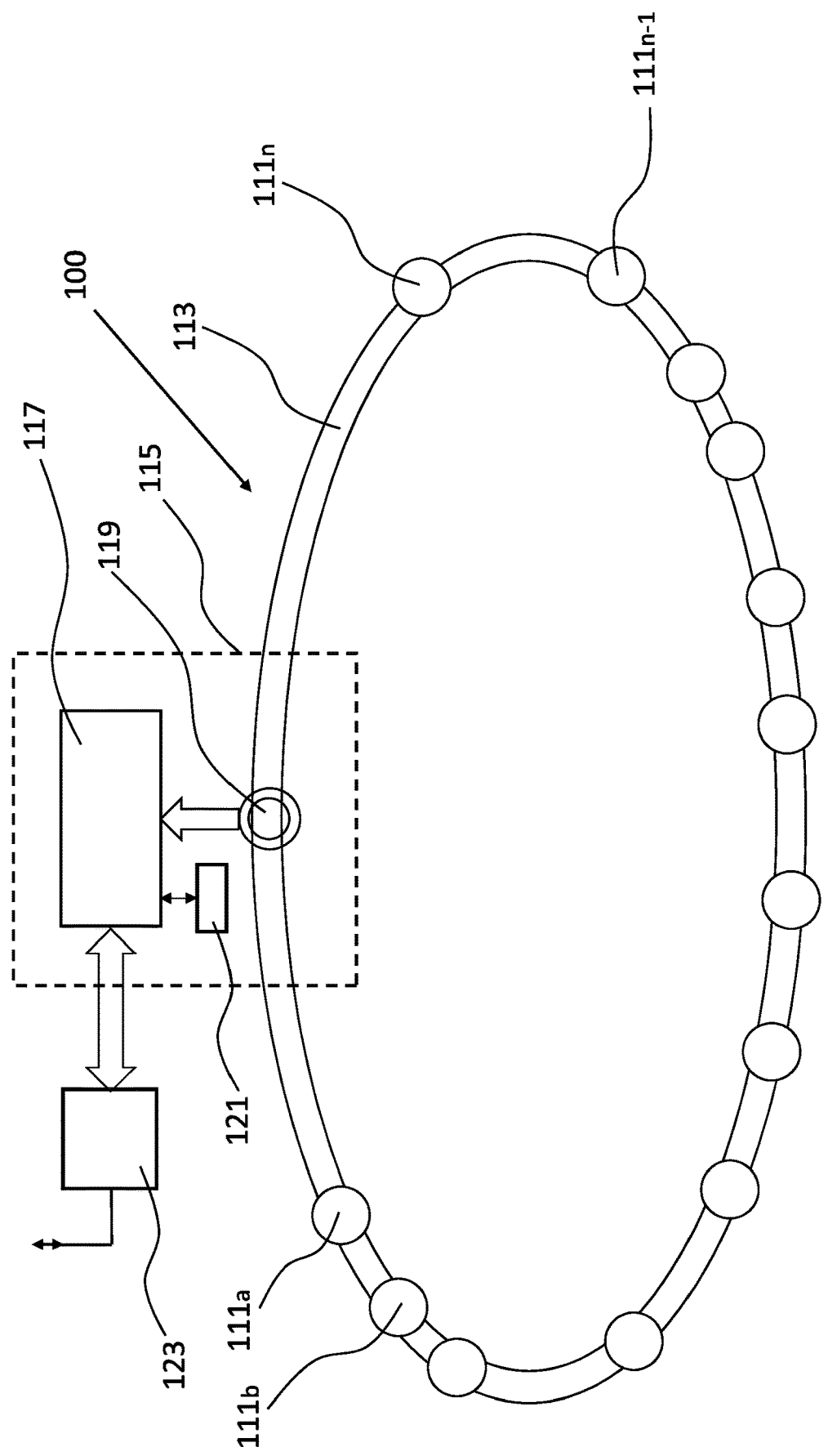
FIG. 2 illustrates in a general schematic form a computerized sub-system of a vehicle, according to an embodiment of the present disclosure.

The following description of the invention is not necessarily limited in its application to the details of construction and the arrangement of the components and/or methods/ processes set forth in the following description and/or illustrated in the drawings. The invention is capable of other embodiments or of being practiced or carried out in various ways.

As will be appreciated by one skilled in the art, aspects of the present disclosure may be embodied as a system, methods/processes or computer program or products. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more non-transitory computer readable (storage) medium(s) having computer readable program code embodied thereon.

An embodiment is an example or implementation of the invention. The various appearances of "one embodiment," "an embodiment" or "some embodiments" do not necessarily all refer to the same embodiment. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the invention. It is understood that the phraseology and terminology employed herein are not to be construed as limiting and are for descriptive purpose only.

Throughout this document, numerous textual and graphical references are made to trademarks, and domain names. These trademarks and domain names are the property of their respective owners, and are referenced only for explanation purposes herein.

It should be noted that orientation related descriptions such as "bottom", "up", "upper", "down", "lower", "top" and the like, assumes that the associated vehicle is operationally situated.

Vehicles are commonly computerized to control a plurality of the vehicles' functions via various communication networks. One of the most common communication network's standard is the Controller Area Network (CAN) bus. The standard CAN-bus allows electronic units such as microcontrollers and devices to communicate with each other without a host computer.

FIG. 1 generally illustrates in schematic form a typical computerized sub-system of a vehicle. The sub-system 10 comprises a plurality of ECUs (also known as "nodes") 11a-11n, each controlling or monitoring a status of one or more devices or schemes of the vehicle, such as the gas pedal, the brakes pedal, the steering wheel, the cabin temperature, the air bags, the gear states, etc. The vehicle may include tens of such ECUs, while the ECUs 11 communicate with one another and with the relevant controlled or monitored devices or schemes via the CAN-bus 13.

The CAN-bus is a message-based protocol. Reference is made to FIG. 1a that schematically shows the structure of a CAN-bus message 20. The message 20 includes the following fields: SF (Start of Field) 21, Message Identifier 23, Control 25, Data 27, CRC 29 Ack 31, and EF (End of Frame) 33. The Message Identifier 23 defines the level of priority of the data protocol. Depending on a specific standard being used, the length of the Message Identifier can be either r a standard format of 11-bits, or an extended format of 29-bits. The SF field 21 indicates which of the two formats is used. The Control Field 25, also known as the Check Field, displays the number of items of information contained in the data field. The Control field allows any receiver of the message to check whether the received message has all the information transferred. The Data Field 27 contains the actual information transmitted on the bus 13, namely the information that can be read by any other ECU 11. The CRC field 30 is a Cyclic Redundancy Check field, that contains 15-bits cyclic redundancy check code. The ACK Field 32, namely the Acknowledge Field, allows any receiver of the transmitted message to signal to the message-originator that it has correctly received a message. If an error is detected, the receiver notifies the message originator immediately. The message originator may then resend the message. The terms "car" and "vehicle" are used herein interchangeably.

FIG. 2 illustrates in a general schematic form a computerized sub-system of a vehicle, according to an embodiment of the present disclosure. In similarity to the prior art sub-system 10, the sub-system 100 of the present disclosure comprises a plurality of ECUs 111a-111n, each controlling or monitoring a status of one or more devices or schemes of the vehicle, such as the gas pedal, the brakes pedal, the steering wheel, the cabin temperature, the air bags, etc. The ECUs 111 communicate with one another or with a respective controlled or monitored devices or schemes over the CAN-bus 113. In addition, the sub-system 100 includes a tele-processor 115. Tele-processor 115, which may have a form of an ECU, generally includes a controller 117, sensor 119, and storage 121. In one aspect of the present disclosure, the tele-processor 115 is activated to record the flow of messages over the CAN-bus 113. More specifically, sensor 119 "listens" to the flow of information over the CAN-bus during a period T1 of, for example, 5 minutes. The flow of the messages during the period T1 is recorded by controller 117, and stored within a temporal storage 121. Periodically, every period T2 of, for example, 60 minutes, tele-processor 115 transmits a messages file containing the accumulated content within storage 121 to a cloud-based (also referred herein as "remote authentication server") vehicle authentication server (not shown in FIG. 2) via transceiver 123. Upon completion of each of such transfer, the messages file is typically deleted, to be ready for a next accumulation of messages. Assuming that the time $T_1$ is 5 minutes, and that the flow rate of messages through the bus is about 2000 messages per second, the size of the messages file is in the order of 100 KB. It should be noted that the periods T1=5 min. and $T_2$=60 min. has been given herein only as an example, as any other convenient periods may be applied. Furthermore, the operation typically occurs only when the vehicle is active, and the transmission typically occurs only at times when there is a cellular communication line available, therefore these periods may vary.

Figure 3:
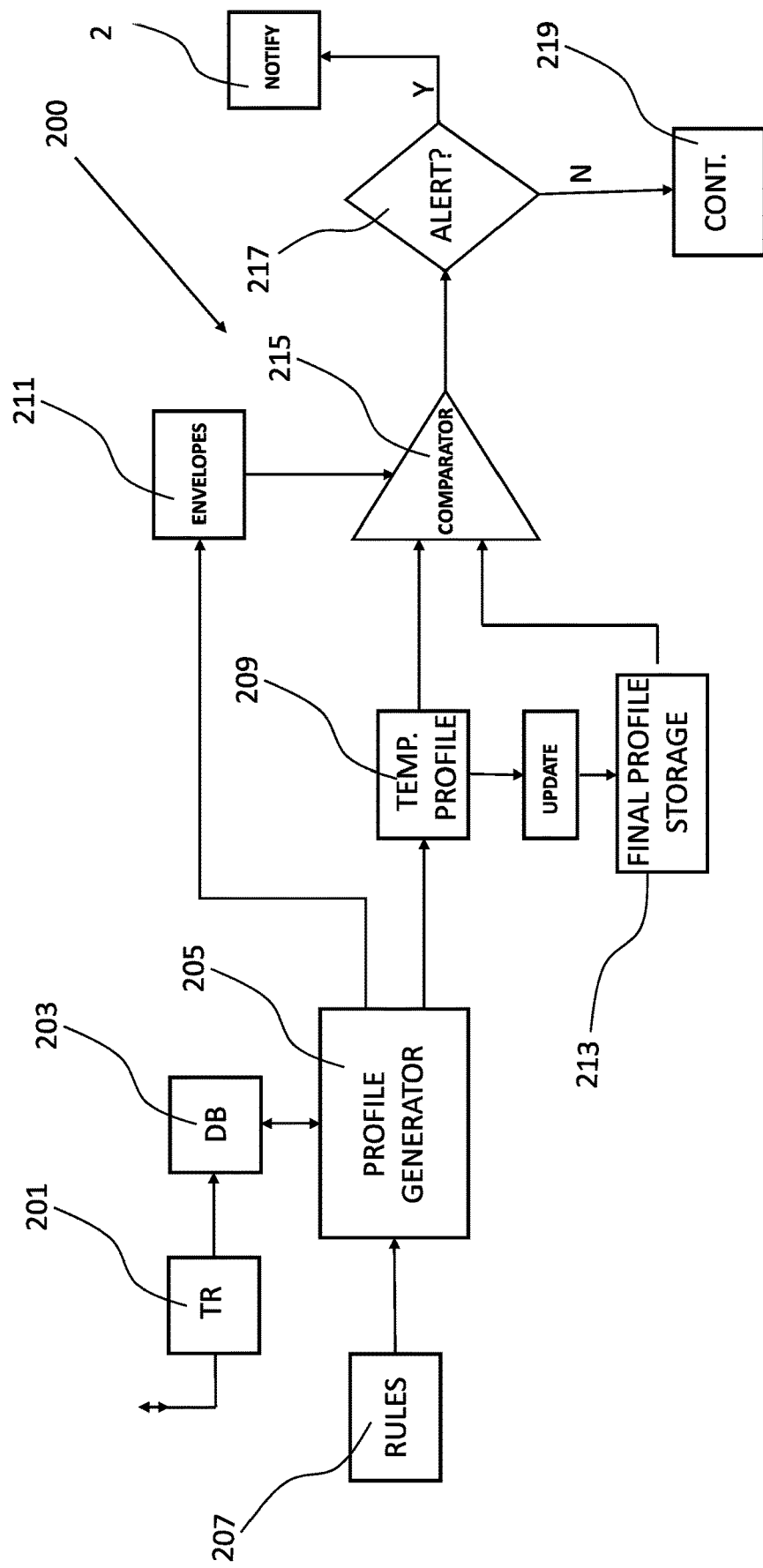
FIG. 3 illustrates in a general schematic form a structure of the cloud-based vehicle authentication server according to an embodiment of the present disclosure.

FIG. 3 illustrates in a general schematic form the structure of the cloud-based ("remote") vehicle authentication server 200. The messages file that was periodically transmitted from the vehicle is received via transceiver 201 and stored within temporary data base 203. Profile generator 205 analyzes the content of data base 203 (typically all the messages that have flown through the CAN-bus 113 during period $T_1$), and based on predefined rules 207 the profile generator creates a temporary profile 209. The temporary profile 209 is typically divided to several selected categories (functions) of the vehicle, and each category contains selected parameters for which the profile contains values that reflect status or characteristics of elements of the car during the car operation. The functions for the temporary profile (and of the final profile which will be discussed hereinafter) are intentionally selected to reflect characteristics and status of machine-based elements, while eliminating functions that depend on the driver of the vehicle, on the driver's behavior, or on environmental conditions during the vehicle's operation. For example, the number of pushing the brake pedal during time $T_1$, or the number and durations of the vehicle being at the 3rd gear state are eliminated from the profile, as they depend on environmental variables (such as on the car driver, on the road structure and road conditions—in or out of the city, heavy or low traffic conditions, whether conditions, etc.) rather than on the machine itself. On the other hand, the frequency at which, for example, gear status messages are reported, may be included in the profile, as the frequency itself is a parameter which is independent of the driver, and of the specific driving and environmental conditions. A typical vehicle may have more than 100 CAN messages serving tens of various vehicle functions. Assuming that the data field is one-byte long (in many cases a bit field is in fact used, that actually divides the byte-long data field to 8 different fields), the size of the information space for characterizing the behavior of the vehicle is $100\times2^8$. The profile of the invention may use some of these characterizing features. Typically, and for the sake of better reliability, the initial procedure for the first creation of the profile from scratch may be based on tens, hundreds, or even thousands of messages files, and may take days or several weeks of such repetitions and updates 212, until the profile in storage 213 is optimized and finalized. The final profile is stored in profile storage 213. A copy of the final profile 213 may also be transmitted (not shown) to the vehicle via the transceiver 201, and stored there. In addition to the temporary and final profiles, 209 and 213, respectively, the profile generator creates a set of envelopes 211 (or such envelopes are defined manually). The set of envelopes define allowed boundaries for each of the parameters in the final profile. More specifically, and as will be described in more details hereinafter, after the profile in storage 213 is finalized, if one or more of the parameters will be found out of its allowed envelope, an alert will be issued. After finalizing and storing of the final profile within profile storage 213, the normal operation of the system of the invention may begin. A messages file is received at transmitter 201 every period T2 and stored within data base 203. The profile generator 205 creates a temporary profile 209 from the messages file. For example, the profile may be generated in the following way: for each ID, the profile decodes a statistical behavior of the data channel corresponding to that ID, for example—histogram variables, continuous variables, logical variables, etc. Typically, a continuous variable is obtained from a sensor or a meter. Therefore, the profile in fact encapsulates, among others, variables joint histograms. The variable may also introduce a time series behavior that is also encapsulated in a standard statistical representation of time series as mentioned in the examples below.

The temporary profile 209 is created each time based on the same rules that created the final profile as stored within profile storage 213, however, within a much shorter period of creation, therefore it is expected to include function parameters of at least some of the functions that were included within the final profile 213. Therefore, there is a basis for comparison between the newly created temporary profile 209 and the stored final profile 213. Moreover, for those overlapped functions that exist both in the temporary profile and in the final profile, the parameters are expected to be the same, or at least within the relevant envelopes' boundaries. Comparator 215, compares between the newly created temporary profile 209 and the final profile 213, and based on the envelopes 211, it determines whether there is a full match, or at least a similarity within the envelopes' boundaries as received at the comparator 215 from the envelopes-unit 211. When a similarity within the envelopes is found, no alert is issued by alert unit 217, and the process continues normally 219 by repeating the procedure as described (while each of such repetition the data base 203 is deleted to begin from scratch. However, if a difference beyond one or more of the envelopes 211 is determined, an alert is issued, and a notification 221 is sent to an appropriate entity. As will be discussed in more details hereinafter, the issuance of an alert typically means that a manipulation within the vehicle's sub-system 100 (see FIG. 2) has occurred. Such a manipulation, if not specifically authorized by a trusted entity, is most probably related to a malicious activity. More specifically, an unauthorized manipulation may relate to, for example, one or more of: (a) unauthorized installation of a new ECU; (b) unauthorized manipulation and control of an existing ECU; or (c) installation of a non-standard element or device within the vehicle's communication network. Of course, the functions and the parameters within the profile are so selected to enable such determinations. For example, while rotating the steering wheel, the related ECU periodically reports the steering wheel angle and angular acceleration on the CAN bus to other systems, that may use this information for their functions. These reports are issued, for example, 100 times per second, and the report frequency by the respective CAN-bus messages is not expected to be changed. If a change in the frequency of the report is determined, this may reflect an unauthorized manipulation in the sub-system. Many other of such parameters can be found in the vehicle's computerized sub-system 100, that altogether can produce the profile 213 of the invention which is repeatedly monitored.

Moreover, it has been found that even for vehicles having an exact same model number, manufacturing year, assemblies and accessories, the profiles that are created according to the present disclosure, and that encompass parameters for a plurality of functions, are distinguished enough from one another to a level that can identify one specific vehicle from a group of supposedly "identical" vehicles. In such a case, the invention uses the profile as the certificate of the vehicle, and this certificate is also used for vehicle identification purposes.

For example, the profile generator 205 may consider the following vehicle behavioral parameters, while creating a vehicle profile, or when setting envelopes for the profile:
Messages White lists;
Messages Black lists;
Message data field types:
   Constant—values did not change;
   Multi-Value—few values spread on several fields (bytes);
   Counter—cyclic counters with some minimal and maximum values—for example, 128-160, cycling over 16 values;
   Discrete—has limited number of different values (for example, 10);
   Continuous—has significant number of different values (for example, more than 10);
   Sensor—value that is continuous and noisy with jitter;
   Cyclic sequence of values (states) [1 18 FF] and vice versa;
Data fields:
   CANID;
   Data field;
   Message priority—lower IDs;
   CRC;
   DCL;
Periodic messages time intervals;
Time interval standard deviation;
Time intervals of reports on a given vehicle state—for example, while parking, the engine temperature may be reported every 15 ms, while on highway, the reports may be issued every 10 ms
Minimal Number of messages within a time interval X;
Series analysis:
   Number of series;
   Intervals between series;
   Intervals within series;
   Weighted hints—W* (If X appeared before 1, else 0);
CAN:
   bus state (normal, off, etc.);
   General CAN statistics;
   Error statistics;
Car State features:
   Ignition on\off;
   Speed;
   Acceleration;
Car type:
   Manufacturer;
   Model;
   Year;
Continuous variables statistical features—max, min, avg., std, etc.

As noted, there are many parameters in the computerized sub-system of the vehicle that are expected to remain substantially constant. There are other parameters that are supposed to change, however, between known and expected boundaries. Both of the above parameters may be used by the profile of the invention. The system of the present disclosure repeatedly checks newly received temporal profiles 209 against the final profile 213 to verify whether one or more of the above parameters have been changed beyond the predefined envelopes (boundaries). Such a change, namely a detection of irregularity, is a hint for: (a) an unauthorized manipulation of the ECUs components; (b) installation of non-original components within the vehicle; or (c) unauthorized manipulation and control of an existing ECU. Therefore, the system of the invention alerts upon any of such irregularity detection.

It should be noted that the temporary profile 409 (or 209) is in fact a diluted profile compared to the final profile 411 (or 213), as during the period T1 (for example, of several minutes) it is assumed that the recorded messages do not cover all the aspects of the car operation, compared to the full (final) profile 213 which is created during a much longer period (for example, several weeks).

In an embodiment of the invention, the profile may include a set of many (for example, hundreds) of histograms. The histogram may be divided to categories (functions), each function may include a plurality of parameters. The bins of the one or more histograms may relate to the values of the function parameters, as determined.

Figure 4:
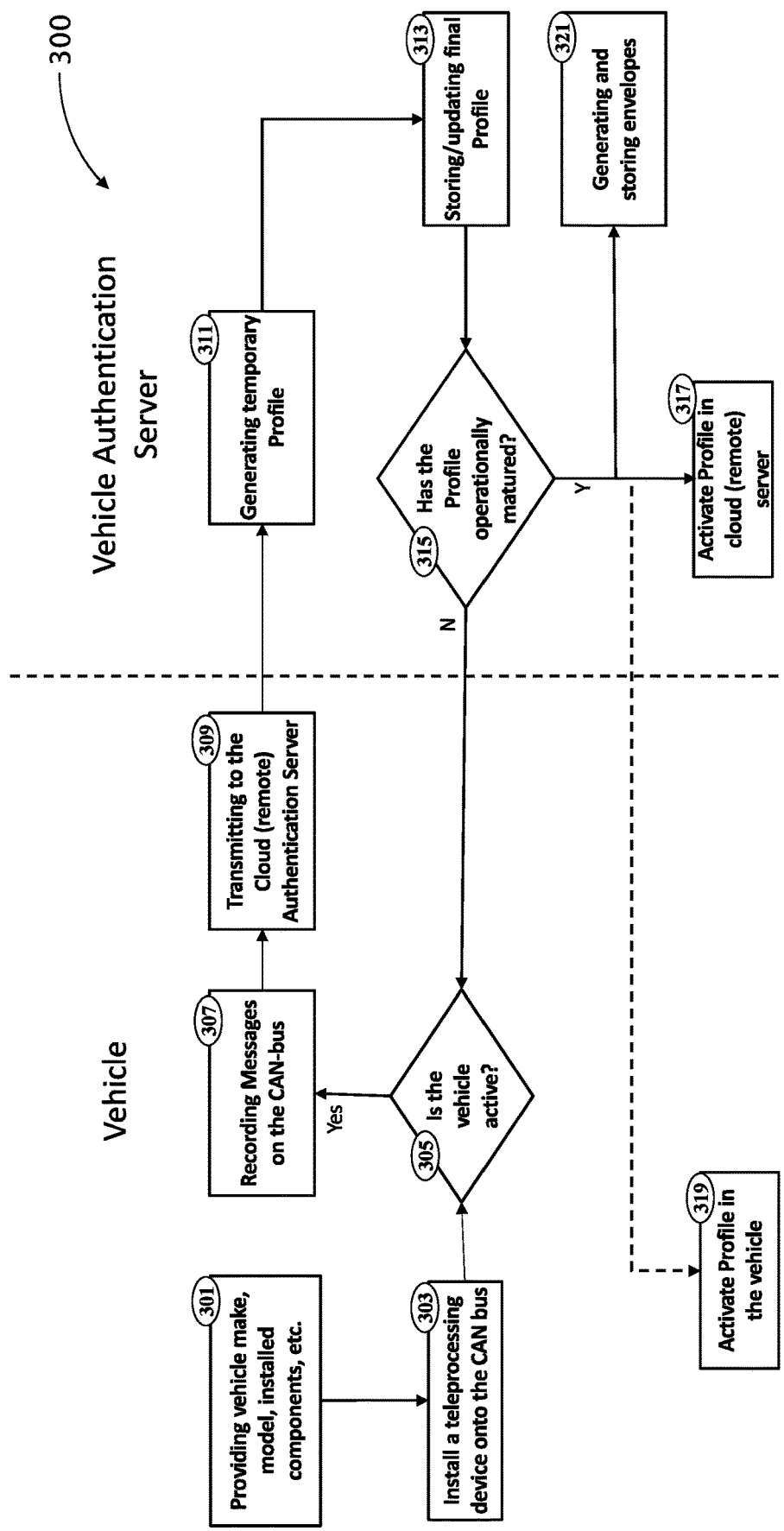
FIG. 4 illustrates in a flow diagram form a procedure for installing the system of the present disclosure within a vehicle and for initially creating the final profile, according to an embodiment of the present disclosure.

FIG. 4 illustrates in a flow diagram form a procedure for installing the system of the invention within a vehicle and for initially creating the final profile, according to an embodiment of the present disclosure. In a preliminary step 301, the procedure begins by providing the vehicle authentication server 200 (see FIG. 2) relevant vehicle related data such as vehicle make, model, installed components, owner data, car owner usage pattern, etc. In step 303, the teleprocessor 115 is installed within the vehicle. The teleprocessor is configured to record (if the vehicle is active 305) CAN-bus messages during each period T1, to store them (step 307), and to transmit 309 the read messages by means of transceiver 123 to the vehicle authentication server 200 periodically, every T2 period. In step 311 a temporary profile is generated by the profile generator 205 and stored (step 313). The procedure returns to via step 315 to step 305, and repeated (from a scratch messages file) in order to update the profile, until the profile within storage 313 is matured (i.e., becomes a final profile). When the profile within the storage is finalized and matured, the profile generator 205 creates (step 321) the envelopes (boundaries) for the final profile. At this stage the final profile is activated within the authentication server (step 317) and optionally also within the vehicle (step 319). Optionally, the final profile is stored 319 only within the vehicle, and not within the authentication server. It should be noted that the final profile storage 313 typically stores a plurality of final profiles.

Figure 5:
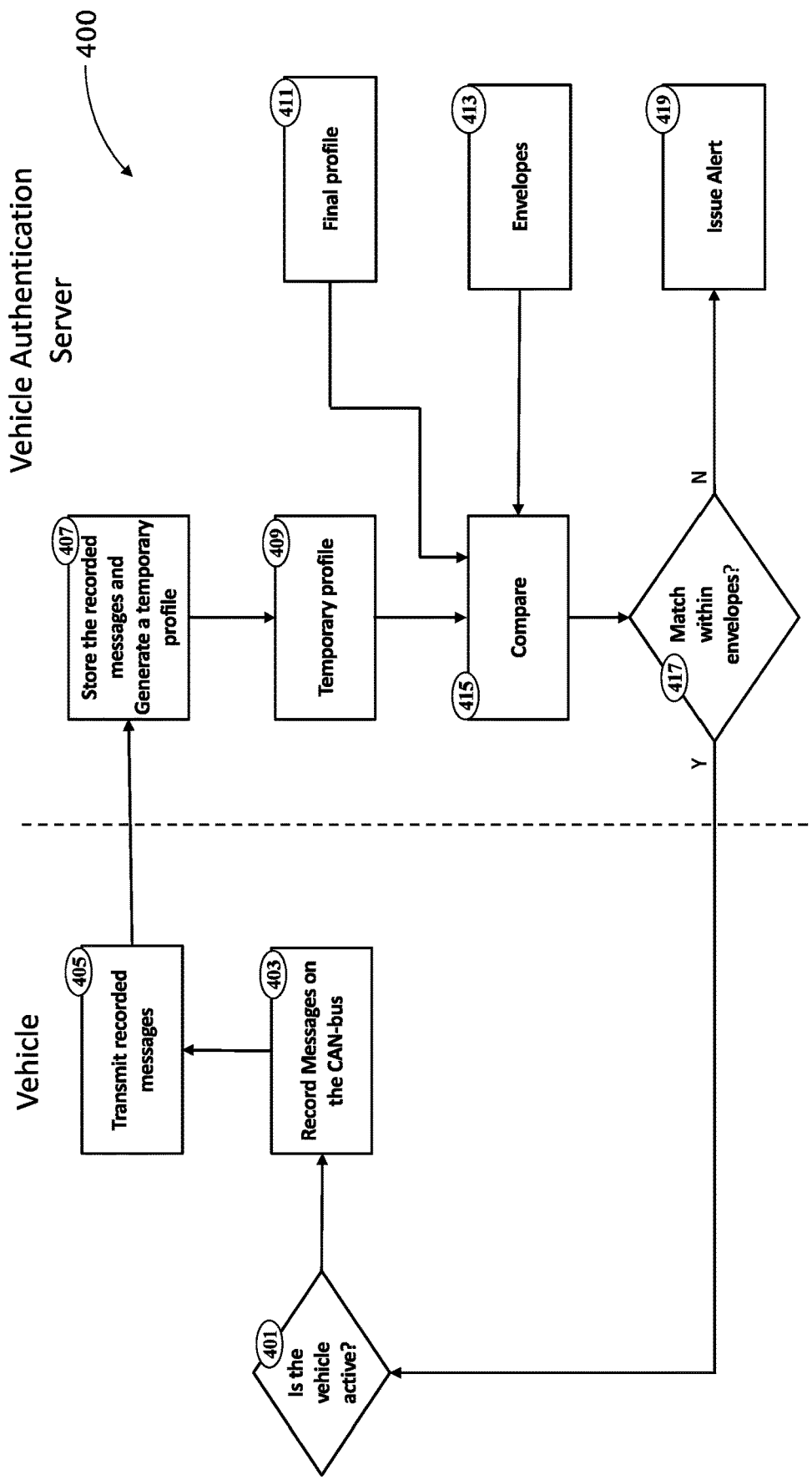
FIG. 5 illustrates in a flow diagram form the normally operating procedure of the system of the present disclosure.

FIG. 5 illustrates in a flow diagram form the normally operating procedure 400 of the system of the invention for repeatedly verifying whether an unauthorized operation within the vehicle computerized sub-system has occurred, or whether a manipulation was made in order to change the "identification" of the vehicle (namely, a change of the vehicle profile which is used as a vehicle certificate). In step 401, the procedure checks whether the vehicle is active. In step 403, and assuming that the vehicle is active, the tele-processor records the flow of messages within the CAN-bus during a period T1. In step 405, at time T2, the recorded messages (i.e., the messages file) are transmitted from the vehicle to the authentication server 200, and stored there. In step 407, the messages are received at the authentication server 200, stored there, and the profile generator 205 (see FIG. 3) generates, based on the stored recorded messages, a temporary profile which is stored (step 409) within the authentication server. In step 415, the temporary profile is compared with the final profile, as was previously created and stored within the authentication server in the procedure of FIG. 4. More specifically, the comparison verifies whether a match exists between the temporary profile 409 and the final profile 411, within the defined envelopes 413. The comparison is forwarded to a decision step 417. If a match is found between the temporary profile and the final profile within the defined envelopes 413, the decision step returns the procedure to step 401 for repeating the entire procedure from the beginning. If, however, a mismatch is found while considering the envelopes, the decision step 417 issues an alert 419. It should be noted that in the optional case where the final profile 319 (see FIG. 4) is stored only within the vehicle, this final profile is transmitted each time together with the messages file to the authentication server in order to carry out the verification.

Figure 6:
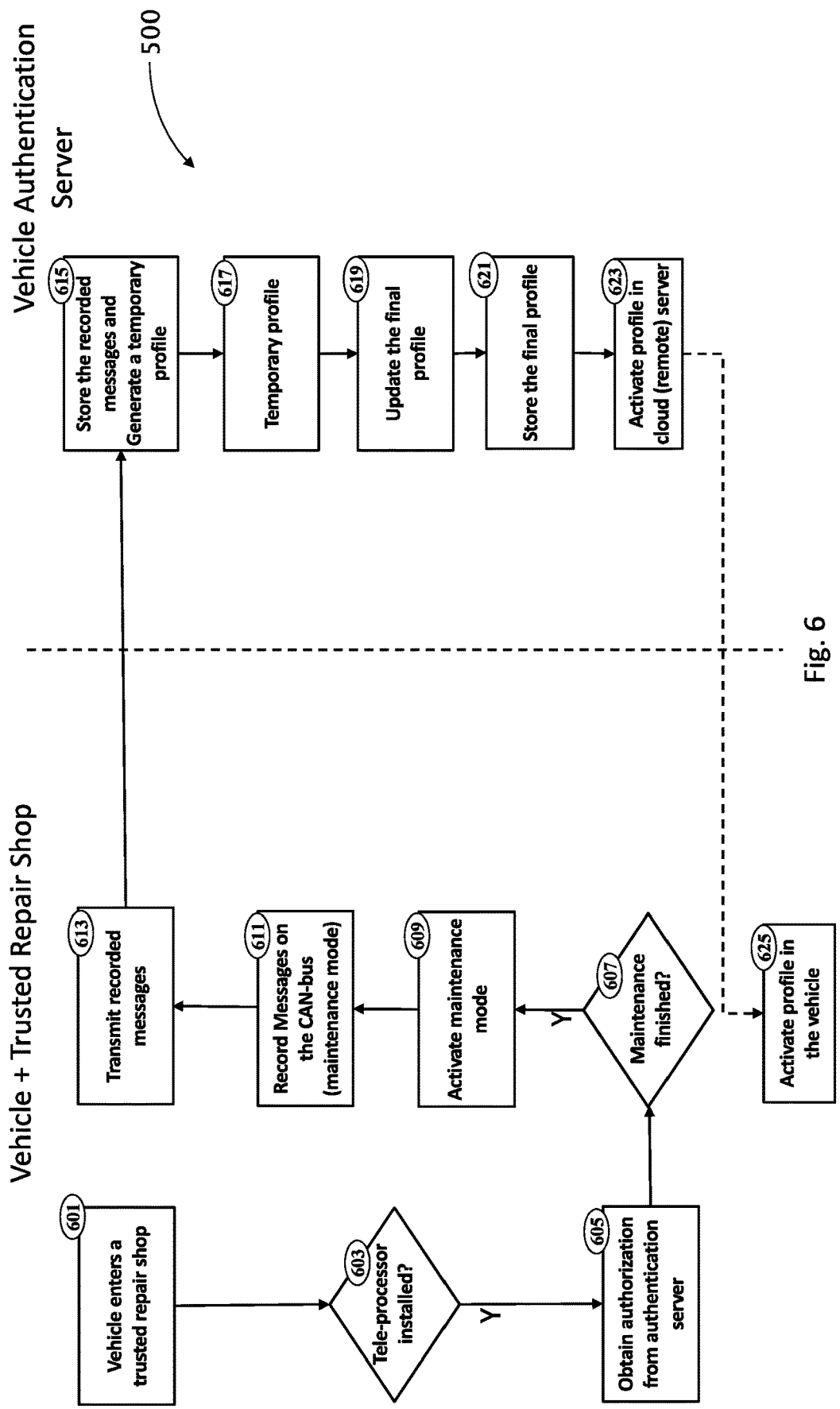
FIG. 6 illustrates in a flow diagram form a procedure for updating the final profile of the present disclosure after visiting a trusted repair shop.

A repair or maintenance of the vehicle may result in a modification of the profile. FIG. 6 illustrates in a flow diagram form a procedure 500 for updating the final profile after visiting a trusted repair shop. In step 601, the vehicle enters the trusted repair shop. In step 603, a verification is made as to whether a tele-processor according to the invention is installed within the vehicle. If a tele-processor is indeed installed, the repair shop communicates with the authentication server in order to notify and possibly obtain authorization to perform maintenance in the computerized sub-system. When such an authorization is obtained from the authentication server, the maintenance is performed by the trusted repair shop. When the maintenance of the vehicle is finished (step 607), the sub-system of the repair shop transfers the vehicle's sub-system into a "maintenance mode". In step 611, the system records the messages on the CAN-bus, in similarity to the messages recording 307 which is performed in the procedure of FIG. 4, however, preferably during a longer period, and while activating a large variety of the vehicles functions in order to reflect the effects of the maintenance in a most accurate manner. Therefore, the duration of the recording following the maintenance is preferably much longer than $T_1$, or it can be in some cases the same as $T_1$. In step 613, the messages file is transmitted to the vehicle authentication server, and stored there (step 615). In step 617, a temporary profile 617 is created by the profile generator, and stored. In step 619 the final profile is updated by the modifications following the maintenance, and stored (step 621). In step 623 the updated final profile is activated at the authentication server, and possibly also at the vehicle.

It should be noted that the remote authentication server 200 of the invention may, in some temporary cases, be the computer at the trusted repair shop which is mainly used for maintenance or testing purposes. In such cases, and during a visit of the vehicle at the trusted repair shop, the computer or server of the trusted repair shop may temporarily perform some or all of the functionalities of the remote authentication server 200 of the invention.

In one embodiment, the method of generating a car temporary profile is based on statistical and time domain information of the collected data. The car temporary profile collects the messages data over time and may infer a profile in a variety of possible methods. For example, a histogram is built for each Message Identifier (ID) 23 and respective Data 27 fields. The profile may also contain time domain information. By collecting such data from CAN-bus 113 for a sufficient duration of time (for example, a few weeks), the vehicle's final profile is created.

EXAMPLE

In a CAN-bus of a specific car, an analysis was performed with respect to the of command whose ID is 0x5de. The relevant data is shown in the following table:

| Meaning | ID | Byte | Value | Interval | STD |
|---|---|---|---|---|---|
| Lights status | 0x5de | | | 0.1 | 0.0005 |
| All lights off | 0x5de | 0 | 0 | 0.1 | 0.0005 |
| High light on | 0x5de | 0 | 1 | 0.1 | 0.0005 |
| Regular light on | 0x5de | 0 | 2 | 0.1 | 0.0005 |
| Parking light on | 0x5de | 0 | 4 | 0.1 | 0.0005 |
| Fog light on | 0x5de | 0 | 10 | 0.1 | 0.0005 |
| Left indicator | 0x5de | 0 | 20 | 0.3 | 0.0012 |
| Right indicator | 0x5de | 0 | 40 | 0.3 | 0.0012 |

The CAN-bus command 0x5de reports in general the status of various lights of the car (high lights, regular lights, parking lights, fog lights, left indicator, and right indicator, or a status of all the lights off). Depending on the value of "byte 0" of the data field of the command, which may have one of the following values, 0, 1, 2, 4, 10, 20, or 40, the status of a specific light is reported by a respective sub-command. A Can-bus analysis of this specific command showed that for almost all of the light statuses, the command repeatedly appears on the bus every period of 0.1 second (with a standard deviation of 0.0005 second), while only the last two statuses that relate to the left and right indicators the command repeatedly appears on the bus every period of 0.3 second (with a standard deviation of 0.0012 second).

Therefore, for the purpose of the profile of the invention the following parameters and respective parameter-values may be used for the command 0x5de:
  a. "Byte 0" may possess only one of the following values 0, 1, 2, 4, 10, 20, or 40. Any other value can be defined beyond a respective envelope of the profile and may issue an alert.
  b. The command 0x5de may appear either every 0.1 second (with a standard deviation of 0.0005 seconds) or every 0.3 second (in case it relates to the right/left indicators, with a standard deviation of 0.0012 seconds). Any appearance of this command beyond these envelopes (boundaries) may issue an alert.

It should be noted, however, that the counted number of appearances of each sub-command, for example, during a period of 30 seconds, cannot be used by the profile of the invention, as it depends on environmental conditions, such as on the driver, on the road itself, on the road conditions, on the weather, etc. This is in contrast to the other parameters that are detailed above that are machine-dependent.

In one embodiment, a Naive Bayes classification may be used in order to determine if two vehicle profiles represent the same vehicle. This is done by comparing, for each ID 23, respective histograms properties. For example, for a message ID=209:

- for car signature profile A, byte 0, the collected values (histogram bins) are [32, 36, 40, 60] with respective probabilities of [0.21 0.42 0.09 0.18].
- for car signature profile B, byte 0, the collected values (bins) are [32, 3, 40, 60] with respective probabilities of [0.1 0.62 0.1 0.18].

The respective bin values 3, 36 are substantially different beyond the defined envelope, therefore the similarity is rejected.

Figure 7:
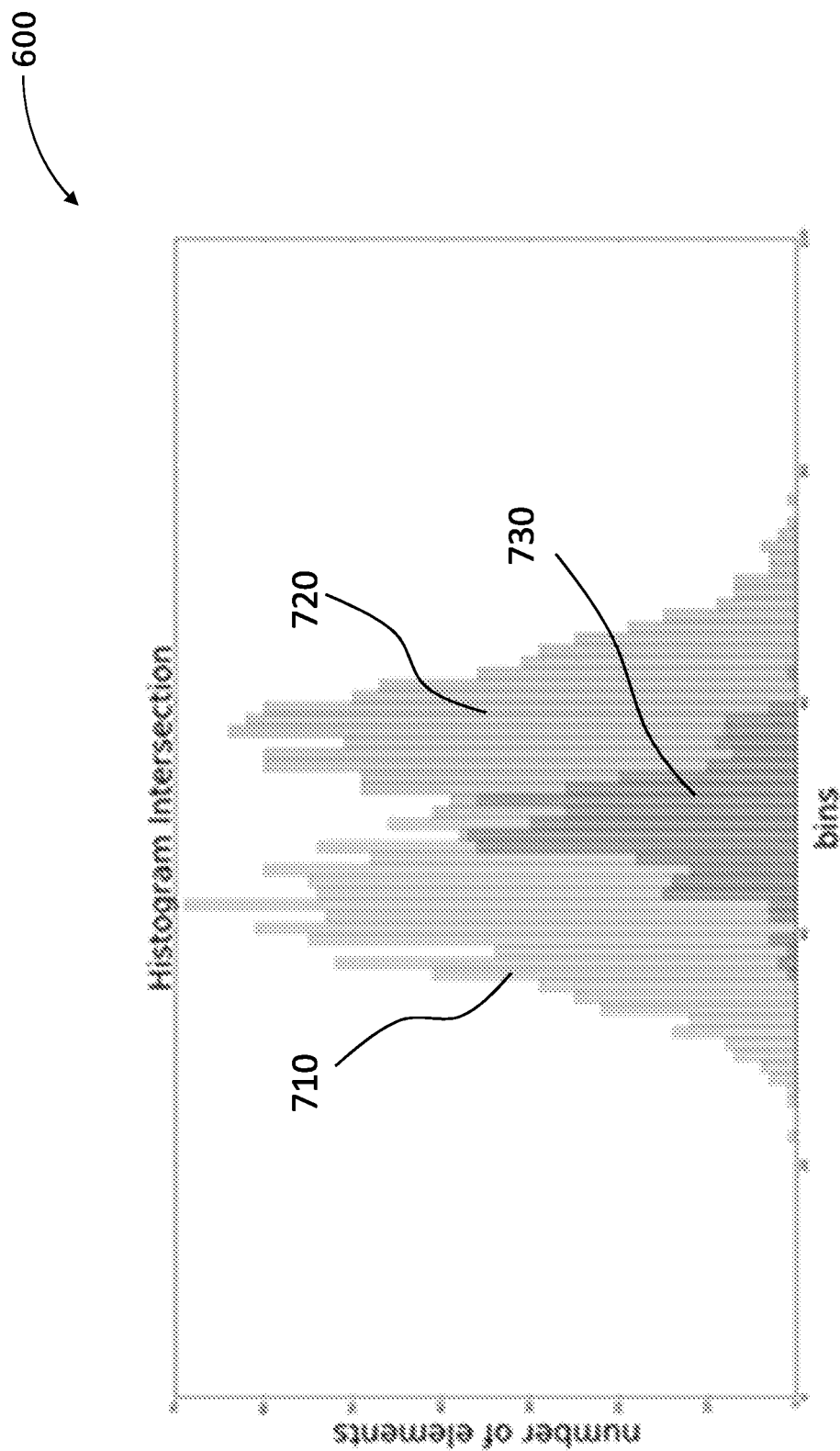
FIG. 7 illustrates an exemplary example of the present disclosure, while the temporary and final profiles are represented by respective histograms.

A standard Naive base approach may be used to compare between message ID's 23 and their respective histograms in order to determine distances between a histogram of a temporary profile and a respective portion of a histogram of the final profile. For continuous values, for each ID 23, a histogram intersection may be evaluated, as shown in the exemplary graphical illustration 700 of FIG. 7. In the histogram of FIG. 7, the bins are a set of values for a specific Message ID 23. The histograms 710 and 720 are clearly different, as the intersection 730 of the two histograms (710 and 720) is considerably small—intersection 730 represents the similarity between the two histograms (710 and 720).

In an embodiment of the invention, the final profile may be passed to a communication peer on demand. Furthermore, a final profile which is stored in a vehicle may be requested by a communication peer from the authentication server. It should be further noted that a car signature profile may be implemented for other in-car communication protocols, for example, with no limitations, Ethernet and Flexray. It should be further noted a vehicle's profile may reflect s partial full vehicle's behavior.

As noted above, the vehicle's profile can be used to determine anomalies in the vehicle's computerized sub-system, such as those that are connected to or resulting from malicious activities, such as cyber-attacks. The system of the invention which compares the temporary profile (which is generated typically during a short period, however repeatedly) with the final profile can also be used in order to authenticate the identity of the vehicle, while the temporary profile serves as a signature of the vehicle, although this signature may somewhat change from one sampling period T1 to another period T1.

The vehicle's profile may also be used for: (a) looking for anomalies for determining the vehicle's authenticity; or: (b) in applications such as Vehicle-to-Vehicle (V2V) authentication, Vehicle-to-Pedestrian (V2P) authentication, Vehicle-to-Cloud (V2C) authentication, Vehicle-to-Infrastructure (V2I) authentication, or Vehicle-to-Other (V2X) authentication.

It should be noted that the term "vehicle authentication server" which was described throughout this application relates to an entity which is at least partially external to the vehicle. However, as is well known in the art of computer systems, various of the modules or components of the authentication server may be distributed and positioned at various physical locations, some of them even within the vehicle. It should also be noted the recorded flow of messages by the tele-processor may include a sample of the messages during the period $T_1$, not necessarily all the messages that flow during this period.

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A system for verifying an identity of a computerized sub-system of
   a vehicle, comprising: at the vehicle:
      a tele-processor configured to periodically record during a period T1 a flow of messages over a bus of the vehicle's sub-system, and to periodically transmit every period T2 the recorded flow of messages to a remote server via a transceiver;
   at a remote authentication server:
      a transceiver configured to receive each of said recorded flows of messages;
      a profile generator stored in a non-transitory computer-readable storage medium configured to generate during an offline stage from vehicle-behavioral-only messages within a plurality of said flows of messages a final profile that forms an identity of said computerized sub-system of the vehicle;
      said profile generator stored in a non-transitory computer-readable storage medium is further configured to generate during run-time, from vehicle-behavioral-only messages within an individual record of a flow of messages a temporary profile, said temporary profile reflecting a signature of the sub-system of the vehicle; and
      a comparator stored in the non-transitory computer-readable storage medium which is configured to compare periodically during run time each of said temporary profiles with said final profile, thereby to verify the identity of the computerized sub-system of the vehicle based on at least partial compliance between said temporary profile and final profile;
   wherein said generation of the final profile and said generation of the temporary profile are based only on the vehicle-behavioral only messages, wherein said vehicle-behavioral only messages are messages that are characterize machine-based elements within the sub-system, while eliminating functions that depend on the driver of the vehicle, on the driver's behavior, or on environmental conditions during the vehicle's operation; and wherein said identity of the computerized sub-system of the vehicle forms a unique identity of the vehicle itself, which individually distinguishes the vehicle over other vehicles, even those having an exact same model number, manufacturing year, assemblies, and/or accessories,
   wherein said comparator is configured to verify whether a match exists between said final profile and said temporary profile within predefined envelopes, and when a mismatch is found, an alert is issued and wherein a mismatch outside of said envelopes hints to one or more of: (a) a malicious activity within said vehicle's sub-system; (b) a malicious activity to fake the identity of the vehicle; (c) installation of a non-original or non-standard element within said vehicle's computerized sub-system; or (d) installation of a non-standard element within a communication network of the vehicle.

2. The system according to claim 1, wherein said tele-processor comprising a sensor configured to sense the messages flowing on the bus, a controller, and a storage for storing accumulated messages.

3. The system according to claim 1, wherein said profile generator is further configured to generate said final profile based on one or more flows of messages, whose accumulated duration in total is significantly longer than the period T1.

4. The system according to claim 1, wherein said profile generator generates said final profile and said temporary profile based on a substantially same set of rules.

5. The system according to claim 1, wherein said remote authentication server further comprising a storage for storing the received flows of messages, the temporary profile, and at least one final profile.

6. The system according to claim 5, wherein said envelopes are defined by said profile generator, manually, or by a combination thereof.

7. The system according to claim 1, wherein said temporary profile and said final profile comprise a plurality of parameters of the computerized sub-system or the vehicle whose values are machine-vehicle dependent, rather than parameters whose values are driver's or environmental dependent.

8. The system according to claim 1, wherein the final profile is stored within the remote authentication server, within the vehicle, or both within the remote server and within the vehicle.

9. The system according to claim 1, wherein the final profile is updated following a maintenance of the vehicle at a trusted repair shop.

10. The system according to claim 1, wherein said bus is a CAN-bus.

11. The system according to claim 1, wherein a communication on the bus is based on Flexray, Ethernet, or another communication protocol suitable for use in a vehicle's bus.

12. The system according to claim 1, wherein the final profile as well as the temporary profile are formed from both behavioral-only messages and from non-behavioral messages.

13. A method for verifying an identity of a computerized sub-system of
a vehicle, comprising:
installing within said computerized sub-system of the vehicle a tele-processor;
periodically recording by said tele-processor during a period T1 a flow of messages over a bus of the vehicle's sub-system, and transmitting periodically every period T2 the recorded flow of messages to a remote authentication server;
at the remote authentication server:
receiving each of said recorded flow of messages;
generating during an offline stage from vehicle-behavioral-only messages within a plurality of said flows of messages a final profile that forms an identity of said sub-system of the vehicle;
generating during run-time from vehicle-behavioral-only messages within each individual record of a flow of messages a temporary profile, said temporary profile reflecting a signature of the sub-system of the vehicle; and
comparing during run time each of said temporary profiles with said final profile, thereby to verify the identity of the computerized sub-system of the vehicle based on at least a partial compliance between said temporary profile and said final profile;
wherein said generation of the final profile and said generation of the temporary profile are based only on the vehicle-behavioral-only messages; wherein said vehicle-behavioral-only messages are messages that characterize machine-based elements, while eliminating functions that depend on the driver of the vehicle, on the driver's behavior, or on environmental conditions during the vehicle's operation; and
wherein said identity of the computerized sub-system of the vehicle forms a unique identity of the vehicle itself, which individually distinguishes the vehicle over other vehicles, even those having an exact same module number, manufacturing year, assemblies, and/or accessories,
verify whether a match exists between said final profile and said temporary profile within predefined envelopes, and when a mismatch is found, an alert is issued, and wherein a mismatch outside of said envelopes hints to one or more of: (a) a malicious activity within said vehicle's sub-system; (b) a malicious activity to fake the identity of the vehicle; (c) installation of a non-original or non-standard element within said vehicle's computerized sub-system; or (d) installation of a non-standard element within a communication network of the vehicle.

14. The method according to claim 13, wherein said final profile is generated based on one or more periodic flows of messages, whose duration in total is much longer than the period T1.

15. The method according to claim 13, wherein said final profile and said temporary profile are created based on a substantially same set of rules.

16. The method according to claim 13, wherein said comparison verifies whether a match exists between said final profile and said temporary profile to within predefined envelopes.

17. The method according to claim 13, wherein said temporary profile and said final profile comprise a plurality of parameters of the computerized sub-system whose values are machine-vehicle dependent, rather than parameters whose values are driver's or environmental dependent.

18. The method according to claim 13, wherein said final profile is updated following a maintenance of the vehicle at a repair shop.

19. The method according to claim 13, wherein the final profile as well as the temporary profile are formed from both behavioral-only messages and from non-behavioral messages.

* * * * *